United States Patent
Choi et al.

(10) Patent No.: US 6,490,082 B2
(45) Date of Patent: Dec. 3, 2002

(54) OPTICAL AMPLIFIER

(75) Inventors: Yong Gyu Choi, Taejon (KR); Kyong Hon Kim, Taejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/728,163

(22) Filed: Dec. 2, 2000

(65) Prior Publication Data

US 2002/0033997 A1 Mar. 21, 2002

(30) Foreign Application Priority Data

Jul. 31, 2000 (KR) ............................................. 00-44233

(51) Int. Cl.$^7$ ............................. H04B 10/12; C03C 3/15

(52) U.S. Cl. ...................... 359/343; 359/342; 359/345; 501/50

(58) Field of Search ..................... 359/341.5; 385/144, 385/142; 501/40, 35

(56) References Cited

U.S. PATENT DOCUMENTS

| | | | | |
|---|---|---|---|---|
| 4,154,503 A | * | 5/1979 | Lettington | 350/96.34 |
| 4,704,371 A | * | 11/1987 | Krolla | 501/40 |
| 4,708,942 A | * | 11/1987 | Nishiii | 501/40 |
| 4,730,896 A | * | 3/1988 | Katsuyama | 350/96.34 |
| 4,962,995 A | * | 10/1990 | Andrews | 350/96.34 |
| 5,309,452 A | * | 5/1994 | Ohishi et al. | 372/6 |
| 5,378,664 A | * | 1/1995 | Becker | 501/40 |
| 5,379,149 A | * | 1/1995 | Snitzer | 359/341 |
| 5,389,584 A | * | 2/1995 | Aitken | 501/40 |
| 5,392,376 A | * | 2/1995 | Aitken | 385/144 |
| 5,535,232 A | | 7/1996 | Bowman et al. | 372/70 |
| 5,568,497 A | | 10/1996 | Bishop et al. | 372/40 |
| 5,629,953 A | | 5/1997 | Bishop et al. | 372/39 |
| 5,746,942 A | * | 5/1998 | Bowman | 252/301.4 H |
| 5,846,889 A | * | 12/1998 | Harbison | 501/40 |
| 5,879,426 A | | 3/1999 | Sanghera et al. | 65/405 |
| 5,936,762 A | * | 8/1999 | Samson | 359/341 |
| 5,956,172 A | * | 9/1999 | Downing | 359/326 |
| 5,973,824 A | * | 10/1999 | Sanghera | 359/341 |
| RE36,513 E | * | 1/2000 | Aitken | 385/144 |
| 6,015,765 A | * | 1/2000 | Harbison | 501/40 |
| 6,037,285 A | * | 3/2000 | Jha | 501/37 |
| 6,128,429 A | * | 10/2000 | Cole | 385/142 |
| 6,141,479 A | * | 10/2000 | Heo | 385/141 |
| 6,148,125 A | * | 11/2000 | Heo | 385/31 |
| 6,272,277 B1 | * | 8/2001 | Heo | 385/142 |

FOREIGN PATENT DOCUMENTS

| | | | | |
|---|---|---|---|---|
| JP | 2000512611 | * | 9/2000 | C03B/19/12 |
| WO | WO 99/10289 | * | 3/1999 | C03C/3/32 |

OTHER PUBLICATIONS

Krummrich, P.M. "Experimental Determination o fthe Emission Cross–Section of the Pump Transition of Praseodymium." IEEE Photonics Tech. Lett, vol. 7, No. 1, Jan. 1995. pp. 62–64.*

Yamada, M. et al. "Low–noise Pr3+–doped flouride fibre amplifier." Elect. Lett, vol. 31, No. 10, May 1995. pp. 806–807.*

(List continued on next page.)

Primary Examiner—Thomas H. Tarcza
Assistant Examiner—Andrew R. Sommer
(74) Attorney, Agent, or Firm—Blakely Sokoloff Taylor & Zafman (57) ABSTRACT

An optical amplifier of the present invention is implemented by using a low phonon energy glass doped with praseodymium ions ($Pr^{3+}$), whereby a wavelength of 1.6 $\mu$m band can be used for an optical transmission. The optical amplifier for amplifying an optical signal includes a low phonon energy optical medium doped with praseodymium ions ($Pr^{3+}$) for utilizing as a gain medium to the optical signal, and a pumping means for pumping the low phonon energy optical medium, thereby to obtain an amplified optical signal.

23 Claims, 6 Drawing Sheets

OTHER PUBLICATIONS

Quimby, R.S. "Improved efficiency of Pr–doped sulfide fiber amplifier using a dual pump scheme." CLEO 2000. May 2000. pp. 285–286.*

Heo, J. et al. "Ultra–low phonon energy glasses for the high–performance 1.3 um–window amplifiers." OFCC 2000, Mar. 2000 pp. 221–223.*

Gu, S.Q. et al "Broad–Band Excitation o fPr3+ Luminesence by Localized Gap State Absorption in Pr:As12Ge33Se55 Glass." IEEE Photonics Tech. Lett, vol. 8, No. 2, Jan. 1996. pp. 260–262.*

Marchese, D. "Pr3+–doped GeS2–Ga2S3–based Chalcgeonide Glasses for 1.3 um Fibre Amplifiers." IEEE 1996, pp. 1525–1528.*

Quimby, R.S. et al. "Quantum Efficiency of Pr3+–doped transparent galss ceramics." CLEO 1997, May 1997, p. 79.*

Marchese, D. et al. "Pr3+–doped 1.3 um optical Fibre Amplifiers in New GeS2–Based Chalcogenide Glasses." 1998. pp. 1390–1394.*

Quimby, R.S. and Aitken, B.G. "Effect of Population Bottle-necking in Pr Fiber Amplifiers with Low–Phonon Hosts." IEEE Photonics Tech Lett. vol. 11, No. 3, Mar. 1999. pp. 313–315.*

Nishida, Y. "Development of an Efficient Prasedoymium–Doped Fiber Amplifier." IEEE J. Quantum Elect., vol. 34, No. 8, Aug. 1998. pp. 1332–1339.*

Ishikawa, E. et al. "Hybrid Pr3+–doped fiber amplifier comprising of flouride and chalcgeonide glasses." OFC 1998. p. 14 141.*

Journal of Non–Crystalline Solids 270, (2000), pp. 137–146.

Optics Express, Aug. 18, 1997, vol. 1, No. 4, pp. 87–96.

IEEE Journal of Quantum Electronics, vol. 30, No. 12, Dec. 1994, pp. 2925–2928.

26th European Conference on Optical Communication, 4 pages.

* cited by examiner

OPTICAL AMPLIFIER

FIELD OF THE INVENTION

The present invention relates to an optical amplifier; and, more particularly, to an optical amplifier incorporating therein an optical gain medium which is made of a low phonon energy glass doped with rare earth ions.

DESCRIPTION OF THE PRIOR ART

As is well known, in an optical transmission system using a wavelength division multiplexing method for enhancing an optical transmission capacity, a narrow gap between channels makes a transmission capacity deteriorated owing to an inherent nonlinear effect in an optical fiber. Therefore, it is preferable that a wavelength range of an optical signal spectrum should be broad in order to enlarge the transmission capacity. The wavelength range of a low optical loss is approximately 1,200~1,700 nm in a conventional transmission silica optical fiber, whereby the broad wavelength range, i.e., approximately 500 nm range, is capable of being used in an optical transmission. Thus, it is most important thing to make an optical amplifier operable in this broad wavelength range.

To make use of this broad range, i.e., 1,200~1,700 nm, a plurality of optical amplifiers has been researched and developed, of which ranges are 1,300 nm, 1,450 nm, 1,500~1,600 nm and 1,650~1,680 nm, respectively. However, there is no optical amplification system utilizing the wavelengths ranging from 1,600 nm to 1,650 nm.

Especially, an erbium ($Er^{3+}$)-doped silicate fiber is used for the wavelength range less than approximately 1,600 nm. This is caused by a characteristic of an intra-4f-configurational energy level structure of erbium ions. Therefore, there has been no ion-doped optical amplifier system that can be used in a range of 1,600~1,650 nm so far.

In case of a thulium-doped fluoride fiber, the gain wavelength range of this fiber is over than approximately 1,650 nm so that it is also difficult to lower the range below 1,650 nm due to the characteristic of thulium ions.

Therefore, it is necessary to develop a new optical amplification system using the wavelength ranging from 1,600 nm to 1,650 nm.

SUMMARY OF THE INVENTION

It is, therefore, an object of the present invention to provide an optical gain medium for use in 1.6 $\mu$m band by doping rare earth ions into a low phonon energy optical medium.

In accordance with one aspect of the present invention, there is provided an optical amplifier for amplifying an optical signal, comprising: a low phonon energy optical medium doped with praseodymium ions ($Pr^{3+}$) for utilizing as a gain medium to the optical signal; and a pumping means for pumping the low phonon energy optical medium to thereby obtain an amplified optical signal in 1,600~1,700 nm range.

In accordance with another aspect of the present invention, there is provided an optical gain medium, comprising: a low phonon energy material; and praseodymium ions doped into the low phonon energy material.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE PREFERRED EMBODIMENTS

Figure 1:
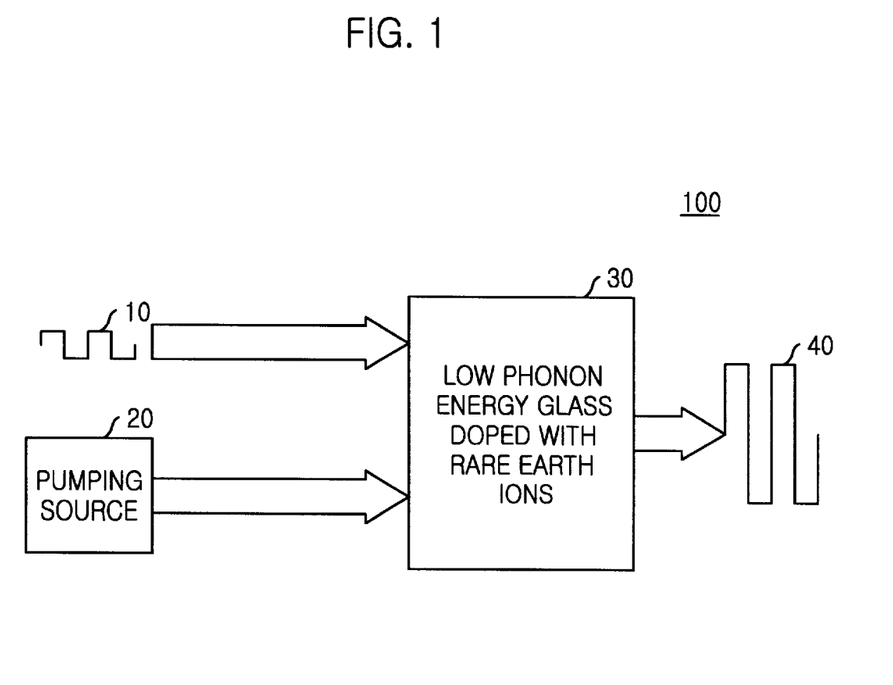
FIG. 1 is a schematic view of an optical amplifier using an optical medium doped with praseodymium ions ($Pr^{3+}$) in accordance with a preferred embodiment of the present invention.

Referring to FIG. 1, there is provided a schematic view of an optical amplifier 100 in which reference numerals 10, 20, 30 and 40 denote an input optical signal, a pump source, a low phonon energy glass doped with rare earth ions, e.g., praseodymium ions ($Pr^{3+}$), and an amplified optical signal, respectively. In this scheme 100, an optical signal 10 with a predetermined wavelength is inputted into the low phonon energy glass 30, and a pumping light from the pump source 20 excites the rare earth ions, e.g., $Pr^{3+}$, in the low phonon energy glass 30 to generate a stimulated emission, thereby obtaining the amplified optical signal 40.

In the optical glass for use in the optical amplifier 100, a phonon energy of the host glass should be less than approximately 320 $cm^{-1}$ to utilize a fluorescence of $Pr^{3+}$ in 1.6 $\mu$m band.

To generate a fluorescence transition of a specified wavelength range in a general optical fiber amplifier and a planar waveguide optical amplifier such as an erbium ($Er^{3+}$)-doped silicate optical fiber amplifier, an optical signal having the specified wavelength is inputted and pumped optically by a pump source 20, thereby inducing a stimulated emission to obtain a high intensity of the output optical signal. At this time, various factors affect gain characteristics of the optical signal. Fundamentally, there are several conditions for achieving effective optical amplification in the specified wavelength range. First, a wavelength range of the fluorescence transition should be within that of the optical signal; second is that a stimulated emission cross-section should be large; third is that a branching ratio of the fluorescence transition should be large; fourth is that a fluorescence lifetime should be sufficiently long; fifth is that the host material should be formed easily in a type of the optical fiber or the planar waveguide; and sixth is that the host material should be stable thermally and mechanically.

A center wavelength of a transition ($^3F_3$, $^3F_4$)→$^6H_4$ is approximately 1,650 nm, wherein this is one of the intra-4f-configurational transition of the $Pr^{3+}$. However, the intensity of the transition is awfully weak and the measured lifetime is very short in conventional optical glasses. Since an energy gap between fluorescing $^3F_3$ level and the next lower-lying $^3F_2$ level is very narrow, i.e., approximately 1,350 cm$^{-1}$, multiphonon relaxation occurs enormously so that the lifetime becomes very shortened. The magnitude of the multiphonon relaxation rate is exponentially proportional to a representative vibrational phonon energy of the host material. Here, we refer to the representative vibrational phonon energy as a phonon energy that mostly well explains magnitude of experimentally measured multiphonon relaxation rate from the fluorescing ($^3F_3$, $^3F_4$) level. That is, the higher the vibrational phonon energy of the host material, the larger the multiphonon relaxation occurs. Generally, a vibration mode related with a glass-forming ion, which constitutes a network of the glass, affects largely the multiphonon relaxation rate of rare earth ions. For example, since the vibrational phonon energy of Si—O bond in silicate glass is approximately 1,100 cm$^{-1}$, the transition of the Pr$^{3+}$ in 1.6 μm band is virtually forbidden in the silicate glass.

Therefore, to enhance the fluorescence intensity emitted from the praseodymium ion, it is necessary for using the low phonon energy host material. The conventional host materials for use in the optical fiber amplifier are alumino-silicate, tellurite, heavy metal fluoride glass and sulfide glass, each phonon energy of which is approximately 1,100 cm$^{-1}$, 700 cm$^{-1}$, 500 cm$^{-1}$ and 350 cm$^{-1}$, respectively.

In more detail, transition characteristics of the fluoride, the sulfide and the selenide glasses are well illustrated in table 1.

Some characteristic parameters associated with the 1.3 μm emission from Pr$^{3+}$: $^1G_4 \to {}^3H_5$ transition in fluoride and sulfide glasses and the 1.6 μm emission from the ($^3F_3$, $^3F_4$)→$^3H_4$ transition in the selenide glass used in the present invention are shown in this table. Here, the characteristic parameters of the fluoride glass are disclosed in D. R. Simons et al., "Pr$^{3+}$-Doped GeS$_x$-Based Glasses for Fiber Amplifiers at 1.3 μm" Opt.Lett., vol.20, no.5, pp. 468–470 (1995). And characteristic parameters of the sulfide glass are disclosed in D. W. Hewark et al., "Quantum-Efficiency of Praseodymium Doped Ga:La:S Glass for 1.3 μm Optical Fiber Amplifiers", IEEE Photon. Technol. Lett., vol.6, no.5, pp. 609–612(1994). Intrinsic radiative lifetime of the ($^3F_3$, $^3F_4$) level is estimated in consideration of the population distribution. A product of measured lifetime and emission cross-section is a useful figure-of-merit from which one can evaluate the efficiency of an optical fiber amplifier. As shown in Table 1, the magnitude of the product of measured lifetime and emission cross-section for the selenide glass is higher than that for the sulfide glass. It is because, in the selenide glass, the emission cross-section is pretty higher than that of the sulfide glass even with comparable fluorescing level lifetimes of the both types of glasses. An oscillator strength of the Pr$^{3+}$: $^3H_4 \to {}^1G_4$ transition is not strong in comparison with the Pr$^{3+}$: $^3H_4 \to ({}^3F_3, {}^3F_4)$, and the fluorescing level of the 1.3 μm emission is at approximately 1,020 nm. There are no commercial high-power laser diodes available for this wavelength. However, strong and stable laser diodes operating at 1480 nm have been well developed, and can be effectively used as pump sources for the 1.6 μm emission. This shall be illustrated further details later on.

TABLE 1

| Glasses | Transition | Phonon energy (cm$^{-1}$) | Calculated lifetime (μs) | Measured lifetime (μs) | Branching ratio (%) | Quantum efficiency (%) | Product of Emission cross-section and measured lifetime (10$^{-26}$ cm$^2$s) |
|---|---|---|---|---|---|---|---|
| Fluoride | $^1G_4 \to {}^3H_5$ | ~500 | 2484 | 110 | 60 | 4 | 36 |
| Sulfide | $^1G_4 \to {}^3H_5$ | ~350 | 510 | 300 | 52 | 60 | 250 |
| Selenide | $({}^3F_3, {}^3F_4) \to {}^3H_4$ | ~200 | ~320 ± 50 | 212 ± 10 | 77 | 65 ± 20 | 636 ± 200 |

Moreover, the energy gap between $^3F_3$ and $^3F_2$ levels are narrow, so that the lifetime of the fluorescence in 1.6 μm band is very short even if the sulfide glass is used as a host material. Thus, to utilize the Pr$^{3+}$-doped glass as the optical amplifier of 1.6 μm band, the phonon energy of the host material should be lower than approximately 320 cm$^{-1}$. Among the glass systems satisfying the above condition, a selenide glass and a telluride glass are most preferred glasses because of their good glass-forming abilities. A main glass-forming ion of the selenide glass is selenium (Se) which makes some representative glass systems such as Ge—As—Se, Ge—Sb—Se, As—Se and so on. And the main glass-forming ion of the telluride glass is tellurium (Te) from which glasses are formed in the compositions of Ge—Se—Te, Ge—As—Se—Te and the like. Additionally, there are other glass materials having low phonon energies such as Ge—S—I, Ge—Ga—S—Br and so on. In conclusion, to utilize practically the fluorescence of the praseodymium ion in the 1.6 μm band, the phonon energy are preferably less than approximately 320 cm$^{-1}$. In the embodiment of the present invention, among numerous compositions in the Ge—As—Se system experimented and analyzed, Ge$_{30}$As$_6$Ga$_2$Se$_{60}$ (mole %) glass is used as the host glass composition. First of all, measuring the solubility of Pr$^{3+}$ into the host glass, the solubility is excellent up to 1 mole % of Pr$^{3+}$, corresponding to approximately 3.5×10$^{20}$ cm$^{-3}$. Namely, the solubility of the rare earth ions is enhanced by means of adding a small amount of gallium (Ga) into the three-component Ge—As—Se glasses.

In more detail, the host glass was prepared from Ge, Ga, As and Se powders with a purity better than 99.999%. Metals of praseodymium and erbium with a purity of 99.999% were used for the source of rare-earths. Up to 1 mole % of praseodymium could be solved in the host. Introduction of small amount of gallium to the Ge—As—Se system enhanced the rare earth solubility. Approximately 15-g batches were weighed in an Ar-purged glove box with O$_2$ and OH$^-$ concentrations less than 2 ppm and 5 ppm, respectively. Silica ampoules containing the starting materials were sealed and melted in a rocking furnace. Temperature was first increased up to 500° C. with a heating rate of 2° C./min and then subsequently elevated up to 1000° C. by 1° C./min. After the melting at 1000° C. for 12 hours, the ampoules with the melt were removed from the furnace and quenched into water. And the samples were annealed at around their glass transition temperatures, i.e., approximately 360° C., for two hours. Approximately 2 mm-thick discs were sliced and optically polished for the measurements.

Furthermore, the selenide glass of the present invention has a superior thermal stability. That is, the transition temperature and the crystallization temperature are approximately ~350° C. and ~510° C., respectively so that fiber drawing from the glass rod can be successfully carried out. In fact, fiber drawing of glass rods with several different compositions in the Ge—As—Ga—Se system had been tried and the drawn fibers were quite good in their optical and mechanical qualities.

Figure 2:
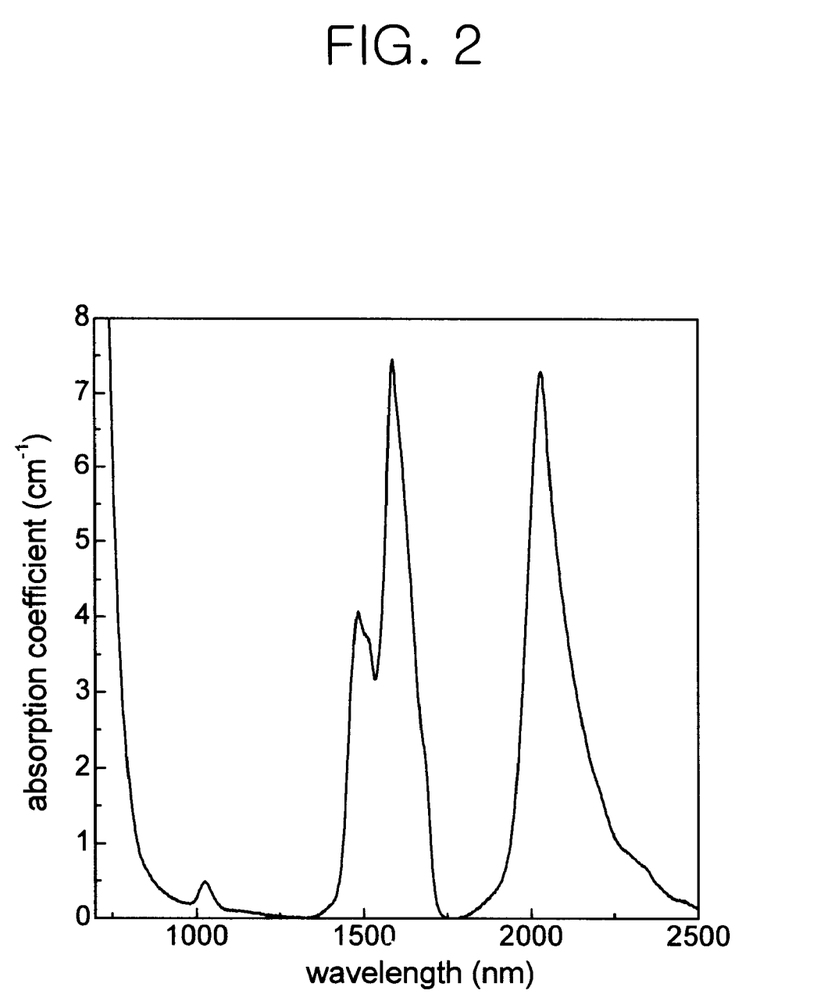
FIG. 2 shows an absorption spectrum of 1 mole % of praseodymium ($Pr^{3+}$)-doped selenide glass.

Referring to FIG. 2, there is provided an absorption spectrum of the glass when 1 mole % of $Pr^{3+}$ is added thereinto. The intrinsic absorption of the host glass at short-wavelength side, starts from approximately 800 nm. Thus, if the wavelength of the pumping light is less than approximately 800 nm, the host glass absorbs a portion of the pumping light so that excitation efficiency becomes lower and further, the host glass may be deformed. In practice, when an 800 nm laser beam with continuous-wave intensity of 150 mW was irradiated on a specimen for 10 minutes, temperature of the specimen was raised sharply and the part of the specimen irradiated by the laser beam, became partially molten.

Figure 3:
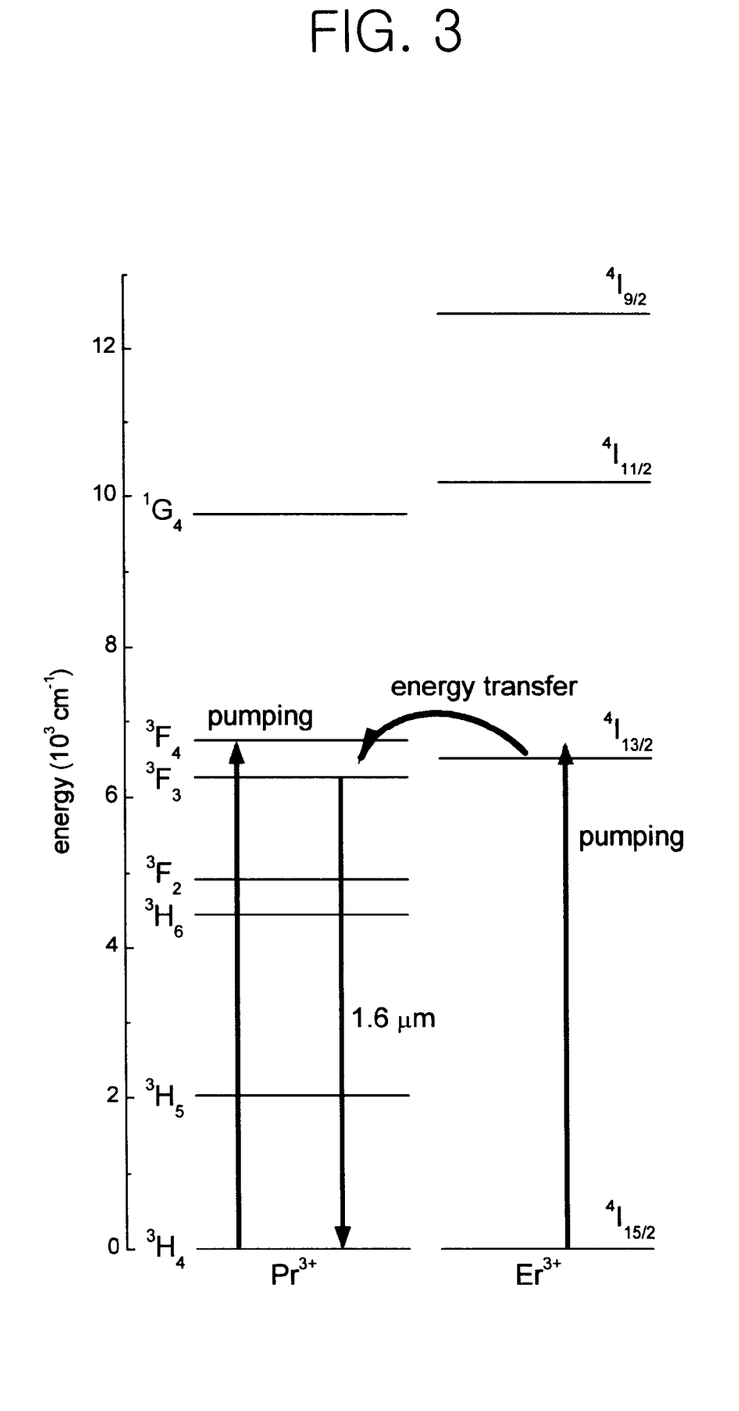
FIG. 3 represents energy levels of $Pr^{3+}$ and an erbium ion ($Er^{3+}$)

Referring to FIG. 3, there is shown schematic energy levels of $Pr^{3+}$ and $Er^{3+}$ illustrating energy transition. Since the energy gap between $^3F_3$ and $^3F_4$ and between $^3F_2$ and $^3H_6$ are so narrow, the Boltzman distribution predicts that a population of each upper level, i.e., $^3F_4$ and $^3F_2$, is 10% and 9%, respectively. Hence, it is proper that $^3F_3$–$^3F_4$ levels and $^3F_2$–$^3H_6$ levels are regarded as a ($^3F_3$, $^3F_4$) manifold and a ($^3F_2$, $^3H_6$) manifold, respectively. The maximum absorption cross-section of the ($^3F_3$, $^3F_4$) level is approximately $2.1 \times 10^{-20}$ cm$^{-2}$ at 1,590 nm. Whereas, at 1,480 nm, the absorption cross-section is approximately $1.2 \times 10^{20}$ cm$^2$ and this value is still higher than those of the general oxide glasses. When Judd-Ofelt analysis is carried out by using oscillator strength of each fluorescence transition, the optimized Judd-Ofelt intensity parameter of $\Omega_1$, $\Omega_2$, $\Omega_3$ are $1.01 \times 10^{-20}$ cm$^{-2}$, $10.54 \times 10^{-20}$ cm$^{-2}$, $2.53 \times 10^{-20}$ cm$^{-2}$, respectively. Note that typical uncertainties of Judd-Ofelt analysis are regarded to be approximately 15%.

Figure 4:
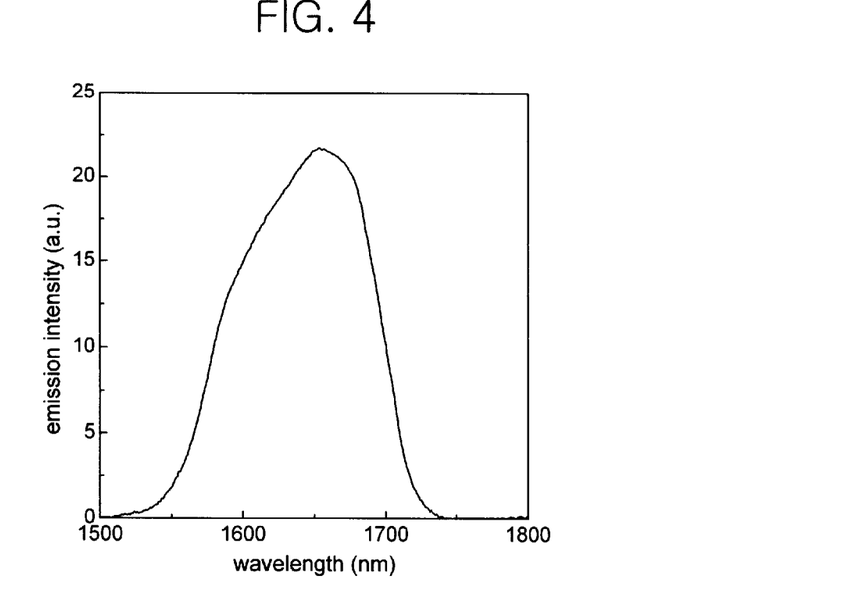
FIG. 4 depicts a fluorescence spectrum of 0.05 mole % of $Pr^{3+}$-doped selenide glass.

Referring to FIG. 4, there is shown a fluorescence emission spectrum of the $Pr^{3+}$-doped selenide glass by an optical pumping with a laser diode of 1,480 nm that is usually used as a pump source of an erbium-doped optical fiber amplifier. The peak wavelength of the fluorescence in the 1.6 $\mu$m band, observed from the host glass composition of the embodiment of the present invention, is approximately 1,650 nm and a full width at half maximum (FWHM) is approximately 100 nm. Of course, the peak wavelength varies according to sample compositions.

Figure 5:
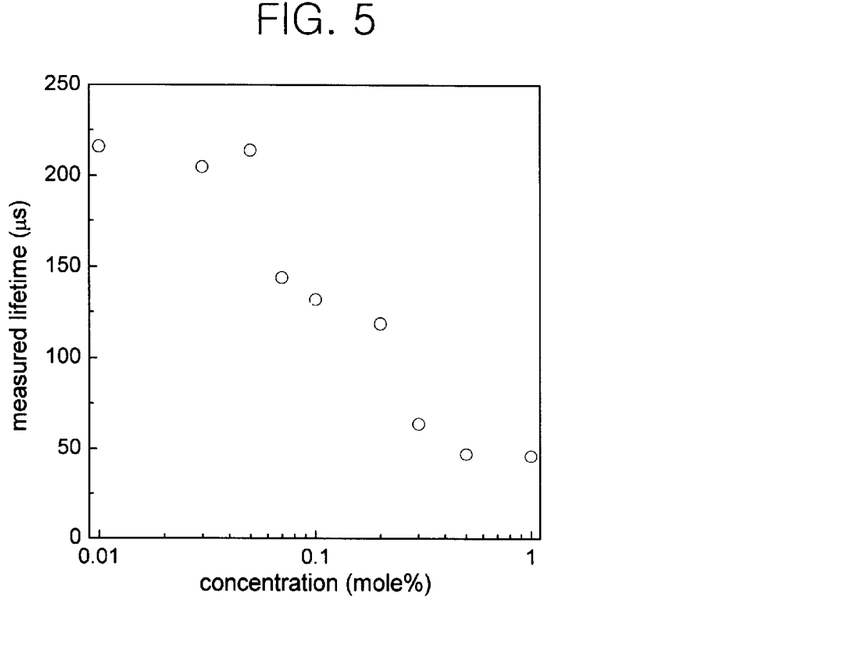
FIG. 5 presents a graph comparing a lifetime versus a concentration of $Pr^{3+}$ in the selenide glass.

Referring to FIG. 5, there is a graph showing a change of the lifetime versus concentration of $Pr^{3+}$. In this graph, it is understood that the lifetime is relatively constant, i.e., 215±5 $\mu$s until 0.05 mole % of $Pr^{3+}$, but the lifetime become decreased sharply over than 0.05 mole %. Quantum efficiency, calculated in comparison with a radiative transition probability by Judd-Ofelt analysis, is approximately 65±20%. At this time, an error of the calculation for the quantum efficiency is thought to be occurred by Judd-Ofelt analysis. Moreover, the maximum stimulated cross-section is calculated to be approximately $(3\pm1) \times 10^{-20}$ cm$^2$, which is a high value. The branching ratio of the transition, i.e., ($^3F_3$, $^3F_4$)→$^3H_4$, is approximately 77%, whereby the radiative transition from the correspondent energy level concentrates well on the fluorescence of 1.6 $\mu$m. As the concentration of the rare earth ion increases, the lifetime decreases, which is so called a concentration quenching. This phenomenon occurs due to the non-radiative energy transfers between the praseodymium ions. Concretely, there are two energy transfer routes responsible for this phenomenon. The first is the transfer of ($^3F_3$, $^3F_4$): $^3H_5$→($^3F_2$, $^3H_6$): ($^3F_2$, $^3H_6$); and the second is the transfer of ($^3F_3$, $^3F_4$): $^3H_4$→($^3F_2$, $^3H_6$): $^3H_5$. To minimize these non-radiative energy transfers, it is appropriate that $Pr^{3+}$ is doped up to 0.05 mole %. And further, it is proper that the doping amount of $Pr^{3+}$ is 0.1 mole % maximally even if the condition is changed.

It is preferable that a pumping wavelength, for obtaining the aimed fluorescence in 1.6 $\mu$m band from $Pr^{3+}$, may be selected in the wavelength band which exhibits the absorption transition of $^3H_4$→($^3F_3$, $^3F_4$). That is, a laser diode of 1,480 nm, which is used for the conventional erbium-doped silicate optical fiber amplifier, is still capable of being used as a pumping means for $Pr^{3+}$-doped low phonon energy glass. High power sources of 1.5 $\mu$m wavelengths can also be used for the excitation. Another pumping method is to utilize the absorption band of $^3H_4$→($^3F_2$, $^3H_6$). Namely, if the pumping wavelength of 2,000 nm is used for excitation, the energy transfer of ($^3F_2$, $^3H_6$): ($^3F_2$, $^3H_6$)→($^3F_3$, $^3F_4$): $^3H_5$ is generated, thereby obtaining population inversion between the fluorescing level and the ground level. Note that a host sensitization results in deformation of the host as well as degradation of pumping efficiency. Similarly, pumping to the $^1G_4$ level is not efficient in that absorption cross-section of the absorption transition is not high and a lot of populations are lost from the $^1G_4$ level through prevailing radiative emissions. In these regards, pump wavelength should be preferably longer than approximately 1400 nm.

Codoping scheme for enhancing the excitation efficiency in 1,480 nm band is illustrated as followings in accordance with another embodiment of the present invention. This embodiment is designed to improve the fluorescence intensity and the apparent lifetime in 1.6 $\mu$m band in case of using the conventional laser diode of 1,480 nm or of 1,530 nm. As described above, 1,480 nm band is used as the pumping wavelength for the erbium-doped optical fiber amplifier. Therefore, the present invention provides $Pr^{3+}$ and $Er^{3+}$-codoped selenide glass. In more detail, this sample is fabricated by varying the additive concentration of the erbium, while the concentration of the praseodymium is fixed to 0.05 mole %. In case of using the laser diode of 1,480 nm for this glass, $Pr^{3+}$ and $Er^{3+}$ are excited simultaneously, wherein the relative portion of excited ions is proportional to the absorption cross-section and the concentration of each ion. As mentioned already, the absorption cross-section of $Pr^{3+}$ in 1,480 nm band is $1.2 \times 10^{-20}$ cm$^2$ and that of the erbium ion is $1.1 \times 10^{-21}$ cm$^2$. Thus, if the pump source excites $Pr^{3+}$ and $Er^{3+}$ of the glass, in which the two ions are codoped and the concentration of each ion is same, the excitation ratio of $Pr^{3+}$ is greater than that of $Er^{3+}$. To improve the fluorescence intensity of $Pr^{3+}$ in 1.6 $\mu$m, the population which exists in the $Er^{3+}$: $^4I_{13/2}$ should be transferred into the level ($^3F_3$, $^3F_4$) of $Pr^{3+}$. Here, the energy transfer occurs in two types, i.e., a radiative energy transfer and a non-radiative energy transfer. The emission spectrum of a donor and the absorption spectrum of an acceptor are overlapped as much as possible in order to activate these energy transfers. That is, as an energy resonance is higher, the energy transfer occurs more actively. When $Pr^{3+}$ and $Er^{3+}$ are codoped according to the present invention, the exemplary fluorescence is generated by the erbium $^4I_{13/2} \rightarrow {}^4I_{15/2}$ transition, wherein the peak wavelength appears at approximately 1,536 nm. The wavelength of this fluorescence coincides with the absorption band ($^3F_3$, $^3F_4$) of $Pr^{3+}$, whereas the emission spectrum of $Pr^{3+}$ and the absorption spectrum of $Er^{3+}$ are scarcely overlapped. Another important factor to affect the magnitude of the energy transfer is that the transition possibility of an energy donor ion should be low so that the measured lifetime may be long. When $Er^{3+}$ is doped alone into the selenide glass composition of the embodiment, the lifetime in $^4I_{13/2}$ level is approximately 3.26 ms so that the lifetime is much longer than that of the ($^3F_3$, $^3F_4$) level in $Pr^{3+}$. From this fact, in case of exciting the $Pr^{3+}$ and $Er^{3+}$-codoped glass, it is understood that the energy transfer is promoted from $Er^{3+}$ to $Pr^{3+}$ and the energy transfer from $Pr^{3+}$ to $Er^{3+}$ hardly occurs. Here, the non-radiative energy transfer from $Er^{3+}$ to $Pr^{3+}$ is dominant than the radiative one because the distance between two ions is very close by virtue of codoping. Generally, when the distance between the donor ion and the acceptor ion is close, the non-radiative energy transfer prevails.

Figure 6:
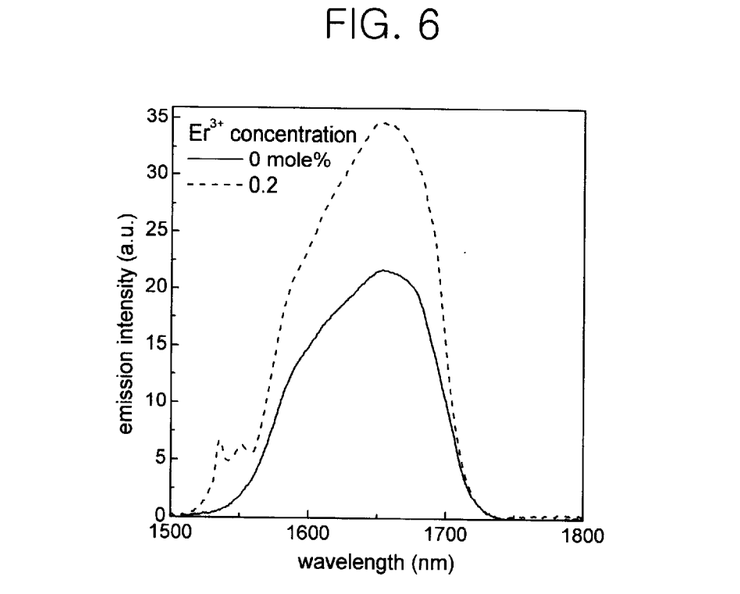
FIG. 6 depicts fluorescence spectra of a glass doped with 0.05 mole % of $Pr^{3+}$ only and a glass codoped with 0.05 mole % of $Pr^{3+}$ and 0.2 mole % of $Er^{3+}$.
Figure 7:
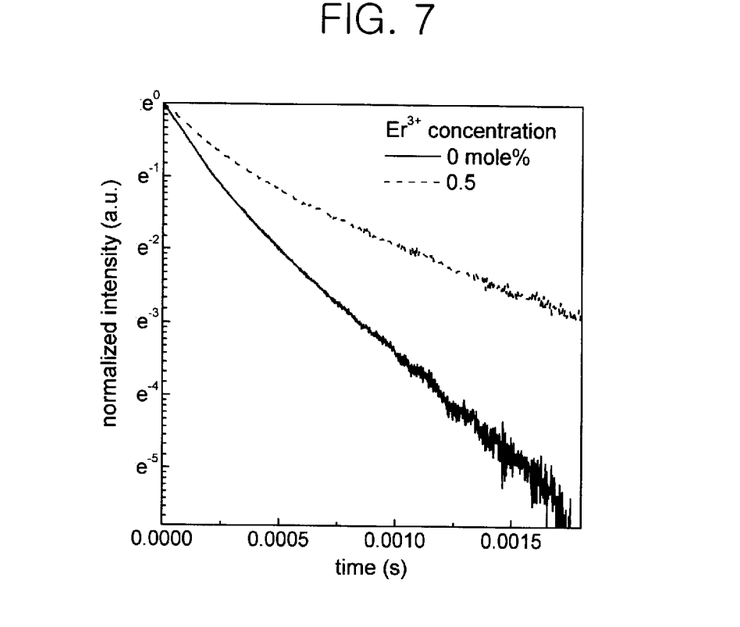
FIG. 7 illustrates normalized fluorescence decay curves, measured at 1.65 $\mu$m, of a glass doped with 0.05 mole % of $Pr^{3+}$ only and a glass codoped with 0.05 mole % of $Pr^{3+}$ and 0.2 mole % of $Er^{3+}$.
Figure 8:
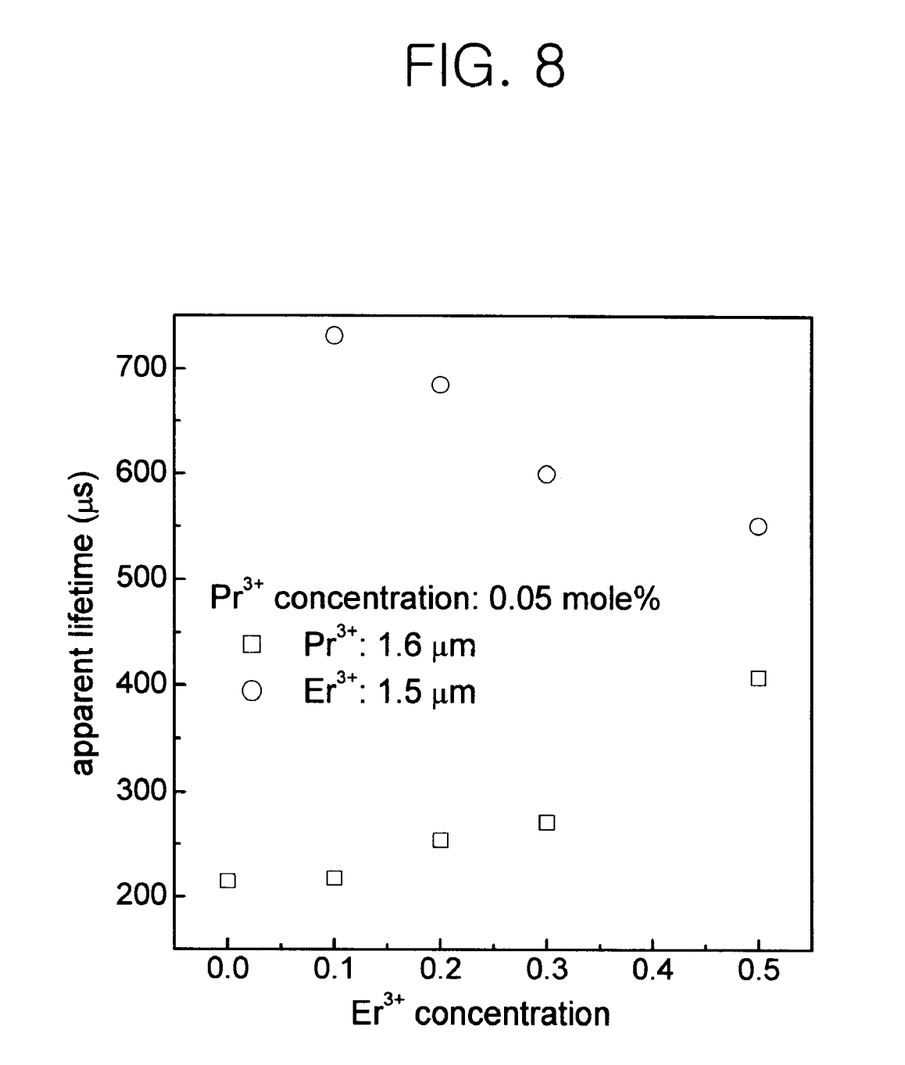
FIG. 8 shows an apparent duration time of the fluorescence at 1.65 $\mu$m of $Pr^{3+}$ and that of the fluorescence at 1.54 $\mu$m of $Er^{3+}$ against doping amount of $Er^{3+}$.

Referring to FIG. 6, there is shown an evidence of the active energy transfer from $Er^{3+}$ to $Pr^{3+}$ in the codoped samples. A typical fluorescence emission spectrum from a codoped sample is well set forth in comparison with that of a single-doped sample. The fluorescence intensity of $Pr^{3+}$ in 1.6 μm becomes stronger when $Pr^{3+}$ is codoped with $Er^{3+}$. Moreover, the fluorescence of $Er^{3+}$ in 1.5 μm band is generated at the same time. Despite the added amount of $Er^{3+}$ is more than that of $Pr^{3+}$, the fluorescence intensity of $Er^{3+}$ in 1.5 μm band is much weaker than that of $Pr^{3+}$ in 1.6 μm band. This is an evidence of the active energy transfer from $Er^{3+}$ to $Pr^{3+}$. Additionally, if the non-radiative energy transfer is generated, the lifetime of the donor is decreased, and at the same time the lifetime of the accepter increases apparently. FIG. 7 shows a representative example of the apparently increased duration time of $Pr^{3+}$: 1.6 μm fluorescence. A sample codoped with 0.05 mole % $Pr^{3+}$ and 0.5 mole % $Er^{3+}$ exhibits the duration time approximately twice larger than that of 0.05 mole % $Pr^3$-single-doped sample. This is also another evidence to illustrate the active energy transfer between two ions. Since the lifetime of $Er^{3+}$ is longer than that of $Pr^{3+}$, the fluorescence lifetime of $Pr^{3+}$ becomes longer in the $Pr^{3+}$ and $Er^{3+}$-codoped glass. Namely, because the population in $Er^{3+}$ is transferred into $Pr^{3+}$ continuously for a long time even if the pumping light is switched off, the lifetime becomes to be longer. On the other hand, lifetimes of the energy donor decrease once a non-radiative energy transfer takes place. This is well described in FIG. 8. For example in 0.1 mole % of Er-single-doped glass, the lifetime of single-doped glass is 3.26 ms. However, by doping 0.05 mole % of $Pr^{3+}$, the lifetime is decreased remarkably to 0.75 ms. The lifetime further decreases with increasing $Er^{3+}$ concentrations even though $Pr^{3+}$ concentration is fixed to be 0.05 mole %. In conclusion, the excitation efficiency of 1,480 nm is remarkably increased in case of using the $Pr^{3+}$ and $Er^{3+}$-codoped glass. If plenty of the praseodymium ions ($Pr^{3+}$) cannot be doped into the glass according to the condition, the $Pr^{3+}$ and $Er^{3+}$-codoped glass may be an efficient optical medium for enhancing the fluorescence intensity in 1.6 μm band. The maximum concentration of the $Er^{3+}$ is determined by considering the solubility of the rare earth ions and magnitude of a ground state absorption at the 1.6 μm band of the erbium ion, but it is preferable that the concentration of the erbium ion is less than 1 mole %. In case of the $Pr^{3+}$ and $Er^{3+}$-codoped glass, the optical fiber laser of 1.5 μm can be used instead of the laser diode of 1,480 nm as aforementioned, and in this case, the effect of both pumping means shows the same result.

In another embodiment, to improve the solubility of $Pr^{3+}$ to the selenide glass, the gallium (Ga) is used in the glass of Ge—As—Se.

While the present invention has been described with respect to a certain preferred embodiment only, other modifications and variations may be made without departing from the spirit and scope of the present invention as set forth in the following claims.

What is claimed is:

1. An optical amplifier for amplifying an optical signal, comprising:

a low phonon energy optical medium doped with praseodymium ions ($Pr^{3+}$) for utilizing as a gain medium to the optical signal; and a pumping means for pumping the low phonon energy optical medium to thereby obtain an amplified optical signal in 1,600~1,700 nm range, wherein erbium ions ($Er^{3+}$) are co-doped into the low phonon energy optical medium as a sensitizer.

2. The optical amplifier as recited in claim 1, wherein the low phonon energy optical medium has a representative phonon energy less than 320 $cm^{-1}$.

3. The optical amplifier as recited in claim 1, wherein the low phonon energy optical medium is a selenide glass.

4. The optical amplifier as recited in claim 3, wherein the selenide glass includes a gallium ion ($Ga^{3+}$) for improving a solubility of the rare earth ions.

5. The optical amplifier as recited in claim 1, wherein the low phonon energy optical medium is a telluride glass.

6. The optical amplifier as recited in claim 1, wherein the low phonon energy optical medium is a type of a single crystal.

7. The optical amplifier as recited in claim 1, wherein the low phonon energy optical medium is a type of an amorphous material.

8. The optical amplifier as recited in claim 1, wherein the amount of the praseodymium ion is less than approximately 0.1 mole %.

9. The optical amplifier as recited in claim 1, wherein the amount of the erbium ion is less than approximately 1 mole %.

10. The optical amplifier as recited in claim 1, wherein the pumping means generates the pumping light having a wavelength ranging from 1,450 nm to 1,600 nm or from 1,900 to 2,100 nm.

11. The optical amplifier as recited in claim 10, wherein optical pumping levels are $Pr^{3+}$: ($^3F_3$, $^3F_4$) or $Pr^{3+}$:($^3F_2$, $^3H_6$) or $Er^{3+}$: $^4I_{13/2}$.

12. The optical amplifier as recited in claim 1, wherein the praseodymium ions and the erbium ions make an energy resonance each other.

13. The optical amplifier as recited in claim 1, wherein the optical medium is in a form of an optical fiber.

14. The optical amplifier as recited in claim 1, wherein the optical medium is in a form of a planar waveguide.

15. An optical gain medium, comprising:

a low phonon energy material;

praseodymium ions doped into the low phonon energy material; and erbium ions co-doped into the low phonon energy material as a sensitizer ion.

16. The optical gain medium as recited in claim 15, wherein the low phonon energy material is a low phonon energy glass.

17. The optical gain medium as recited in claim 15, wherein the low phonon energy material has a representative phonon energy less than 320 cm$^{-1}$.

18. The optical gain medium as recited in claim 15, wherein an amount of $Pr^{3+}$ is less than approximately 0.1 mole %.

19. The optical gain medium as recited in claim 15, wherein the amount of $Er^{3+}$ is less than approximately 1 mole %.

20. The optical gain medium as recited in claim 15, wherein the low phonon energy material is a type of an amorphous material.

21. The optical gain medium as recited in claim 15, wherein the low phonon energy material is a selenide glass.

22. The optical gain medium as recited in claim 21, wherein the selenide glass includes a gallium ion ($Ga^{3+}$) for improving solubility of the $Pr^{3+}$.

23. The optical gain medium as recited in claim 15, wherein the low phonon energy material is a telluride glass.

* * * * *